United States Patent
Cheng

(10) Patent No.: US 9,317,958 B2
(45) Date of Patent: Apr. 19, 2016

(54) AUTO-CONVERGENCE SYSTEM WITH ACTIVE LEARNING AND RELATED METHOD AND MACHINE-READABLE MEDIUM THEREOF

(71) Applicant: MEDIATEK INC., Hsin-Chu (TW)

(72) Inventor: Chia-Ming Cheng, Hsinchu (TW)

(73) Assignee: MEDIATEK INC., Science-Based Industrial Park, Hsin-Chu (TW)

(*) Notice: Subject to any disclaimer, the term of this patent is extended or adjusted under 35 U.S.C. 154(b) by 309 days.

(21) Appl. No.: 13/787,830

(22) Filed: Mar. 7, 2013

(65) Prior Publication Data
US 2014/0254917 A1    Sep. 11, 2014

(51) Int. Cl.
*G06K 9/00* (2006.01)
*G06T 15/00* (2011.01)
*H04N 13/00* (2006.01)

(52) U.S. Cl.
CPC ............ *G06T 15/00* (2013.01); *H04N 13/0022* (2013.01); *H04N 2213/002* (2013.01)

(58) Field of Classification Search
None
See application file for complete search history.

(56) References Cited

U.S. PATENT DOCUMENTS

2012/0051665 A1*  3/2012  Adams et al. ................ 382/294

FOREIGN PATENT DOCUMENTS

| CN | 102006494 A | 4/2011 |
|---|---|---|
| CN | 102740104 A | 10/2012 |
| CN | 102939764 A | 2/2013 |
| WO | 2012021265 | 2/2012 |
| WO | 2012060182 A1 | 5/2012 |

* cited by examiner

*Primary Examiner* — Mark Roz
(74) *Attorney, Agent, or Firm* — Winston Hsu; Scott Margo

(57) ABSTRACT

An auto-convergence system includes a disparity unit, a convergence unit and an active learning unit. The disparity unit performs a disparity analysis upon an input stereo image pair, and accordingly obtains a disparity distribution of the input stereo image pair. The convergence unit adjusts the input stereo image pair adaptively according to the disparity distribution and a learned convergence range, and accordingly generates an output stereo image pair for playback. The active learning unit actively learns a convergence range during playback of stereo image pairs, and accordingly determines the learned convergence range.

18 Claims, 9 Drawing Sheets

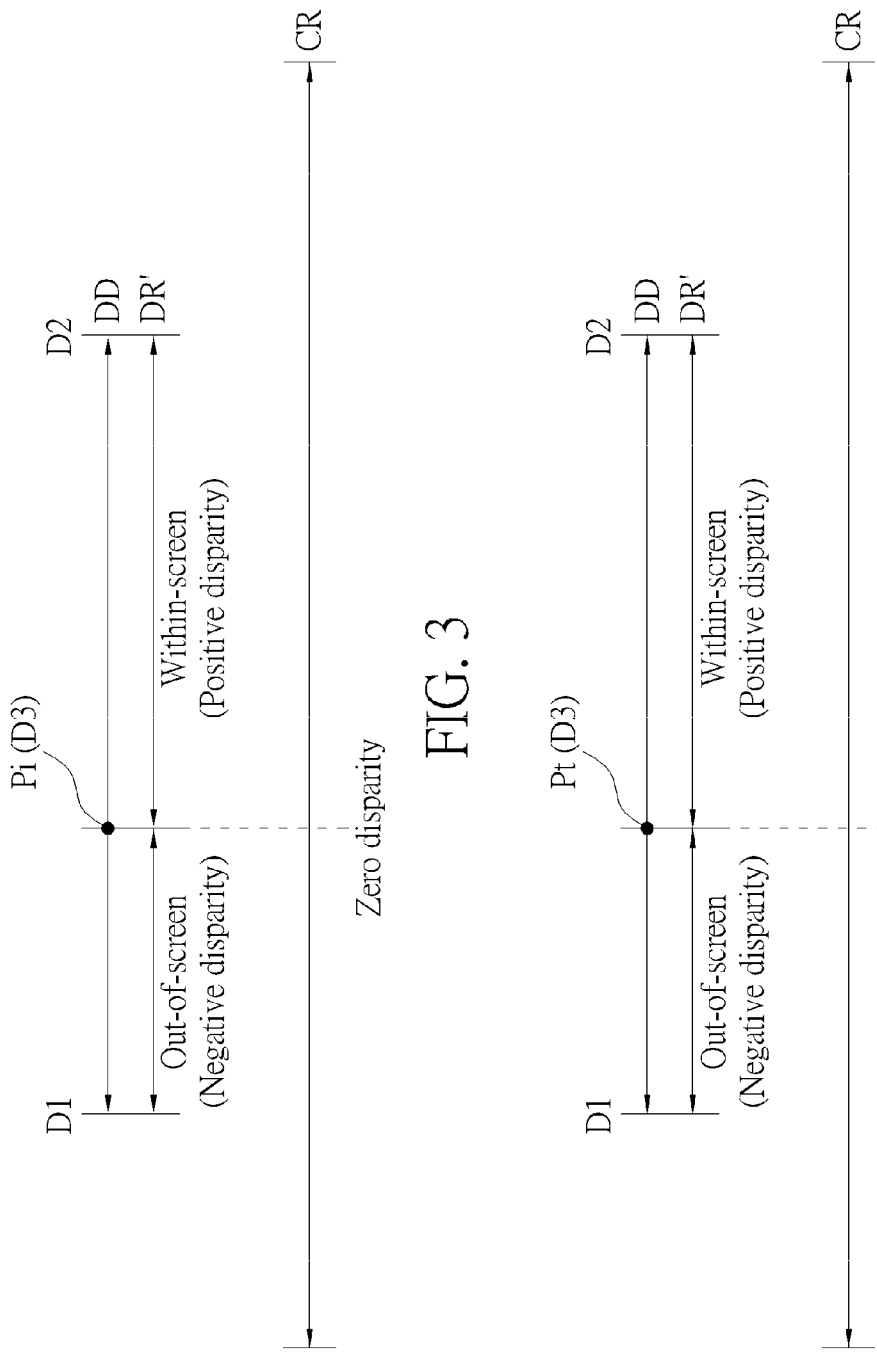

AUTO-CONVERGENCE SYSTEM WITH ACTIVE LEARNING AND RELATED METHOD AND MACHINE-READABLE MEDIUM THEREOF

BACKGROUND

The disclosed embodiments of the present invention relate to the stereo video/image playback, and more particularly, to an auto-convergence system with active learning and related method and machine-readable medium thereof.

With the development of science and technology, users are pursing stereo and more real image displays rather than high quality images. There are two techniques of present stereo display. One is to use a display apparatus, which collaborates with glasses (such as anaglyph glasses, polarization glasses or shutter glasses), while the other one is to use only a display apparatus without any accompanying glasses. No matter which technique is utilized, the main theory of stereo image display is to make the left eye and the right eye see different images, thus the brain will regard the different images seen from two eyes as a stereo image.

In general, the disparity of an object/pixel presented in a stereo image pair composed of a left-view image and a right-view image determines user's depth perception of the object/pixel. However, if the disparity is not properly set, the user may suffer from visual fatigue caused by, for example, vertical disparity error and/or vergence-accommodation conflict. To mitigate the visual fatigue, one possible solution is to make the depth perception comfortable to the user. One conventional design simply employs a fixed setting of the comfortable convergence range which is determined solely based on the specification of the stereo display apparatus such as a pre-defined vergence angle of a three-dimensional (3D) display panel. Unfortunately, such a fixed convergence range is unable to meet depth perception preferences of all users due to the fact that a subjective preference of depth perception is hard to be well defined for all users. For example, some users may prefer stronger perception of depth, while other users may prefer more comfortable visual effect. Besides, there may be a significant difference between theoretical and empirical settings of the comfortable convergence range for a user, and the depth perception of a stereo video/image may be content dependent. Hence, there is no general setting of the comfortable convergence range to satisfy all users. As a result, the conventional design is unable to make different users have best 3D viewing experiences under the same setting of the comfortable convergence range.

Thus, there is a need for an innovative design for an intelligent personalized auto-convergence scheme which is capable of making the comfortable convergence range adapted to the personal preference of each user.

SUMMARY

In accordance with exemplary embodiments of the present invention, an auto-convergence system with active learning and related method and machine-readable medium thereof are proposed to solve the above-mentioned problem.

According to a first aspect of the present invention, an exemplary auto-convergence system is disclosed. The exemplary auto-convergence system includes a disparity unit, a convergence unit and an active learning unit. The disparity unit is arranged for performing a disparity analysis upon an input stereo image pair, and accordingly obtaining a disparity distribution of the input stereo image pair. The convergence unit is coupled to the disparity unit, and arranged for adaptively adjusting the input stereo image pair according to the disparity distribution and a learned convergence range, and accordingly generating an output stereo image pair for playback. The active learning unit is coupled to the convergence unit, and arranged for actively learning a convergence range during playback of stereo image pairs and accordingly determining the learned convergence range.

According to a second aspect of the present invention, an exemplary auto-convergence method is disclosed. The exemplary auto-convergence method includes: performing a disparity analysis upon an input stereo image pair, and accordingly obtaining a disparity distribution of the input stereo image pair; actively learning a convergence range during playback of stereo image pairs and accordingly determining a learned convergence range; and performing an active learning process for adaptively adjusting the input stereo image pair according to the disparity distribution and the learned convergence range, and accordingly generating an output stereo image pair for playback.

According to a third aspect of the present invention, an exemplary non-transitory machine-readable medium which stores a program code is disclosed. When the program code is executed by a processor, the processor is instructed to perform following steps: performing a disparity analysis upon an input stereo image pair, and accordingly obtaining a disparity distribution of the input stereo image pair; actively learning a convergence range during playback of stereo image pairs and accordingly determining a learned convergence range; and performing an active learning process for adaptively adjusting the input stereo image pair according to the disparity distribution and the learned convergence range, and accordingly generating an output stereo image pair for playback.

These and other objectives of the present invention will no doubt become obvious to those of ordinary skill in the art after reading the following detailed description of the preferred embodiment that is illustrated in the various figures and drawings.

BRIEF DESCRIPTION OF THE DRAWINGS

FIG. 3 and FIG. 4 show the operation of the convergence unit under a condition where the shifted disparity range is within the learned convergence range.

DETAILED DESCRIPTION

Certain terms are used throughout the description and following claims to refer to particular components. As one skilled in the art will appreciate, manufacturers may refer to a component by different names. This document does not intend to distinguish between components that differ in name but not function. In the following description and in the claims, the terms "include" and "comprise" are used in an open-ended fashion, and thus should be interpreted to mean "include, but not limited to . . . ". Also, the term "couple" is intended to mean either an indirect or direct electrical connection. Accordingly, if one device is electrically connected to another device, that connection may be through a direct electrical connection, or through an indirect electrical connection via other devices and connections.

The main concept of the present invention is using an active learning process to provide a learned convergence range for auto-convergence control. Specifically, the learned convergence range is updated in response to user interaction. In this way, a subjective preference of depth perception of an individual user can be estimated using the active learning process, thus improving the 3D viewing experience of the user. Hence, the present invention is able to make different users have best 3D viewing experiences under respective personalized comfortable convergence range settings. Further details are described as below.

Figure 1:
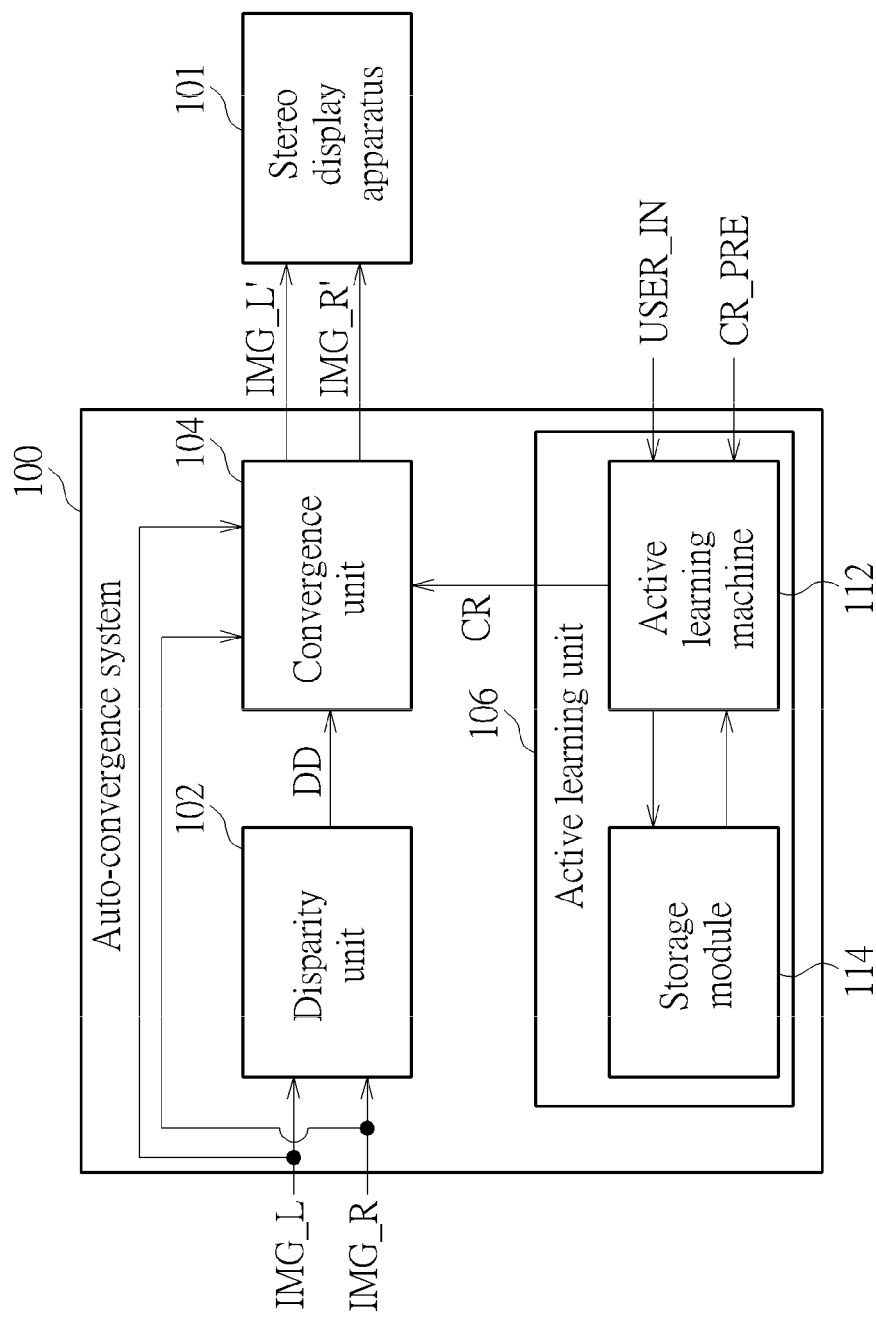
FIG. 1 is a block diagram illustrating an auto-convergence system according to a first embodiment of the present invention.

FIG. 1 is a block diagram illustrating an auto-convergence system according to a first embodiment of the present invention. The exemplary auto-convergence system 100 includes a disparity unit 102, a convergence unit 104 and an active learning unit 106, where the active learning unit 106 includes an active learning machine 112 and a storage module 114. The auto-convergence system 100 is arranged to generate an output stereo image pair, composed of a left-view image IMG_L' and a right-view image IMG_R', to a stereo display apparatus (e.g., a 3D display panel) 101 for playback according to an input stereo image pair, composed of a left-view image IMG_L and a right-view image IMG_R. By way of example, the auto-convergence system 100 may be implemented in any electronic device equipped with the stereo display apparatus 101, such as a digital television (DTV), a mobile device, or a tablet. The disparity distribution of the output stereo image pair may be different from that of the input stereo image pair due to the auto-convergence function. Preferably, the output stereo image pair would have an optimally personalized convergence setting. Thus, when the output stereo image pair is displayed on the stereo display apparatus 101, the user could perceive a comfortable visual effect as desired.

Figure 2:
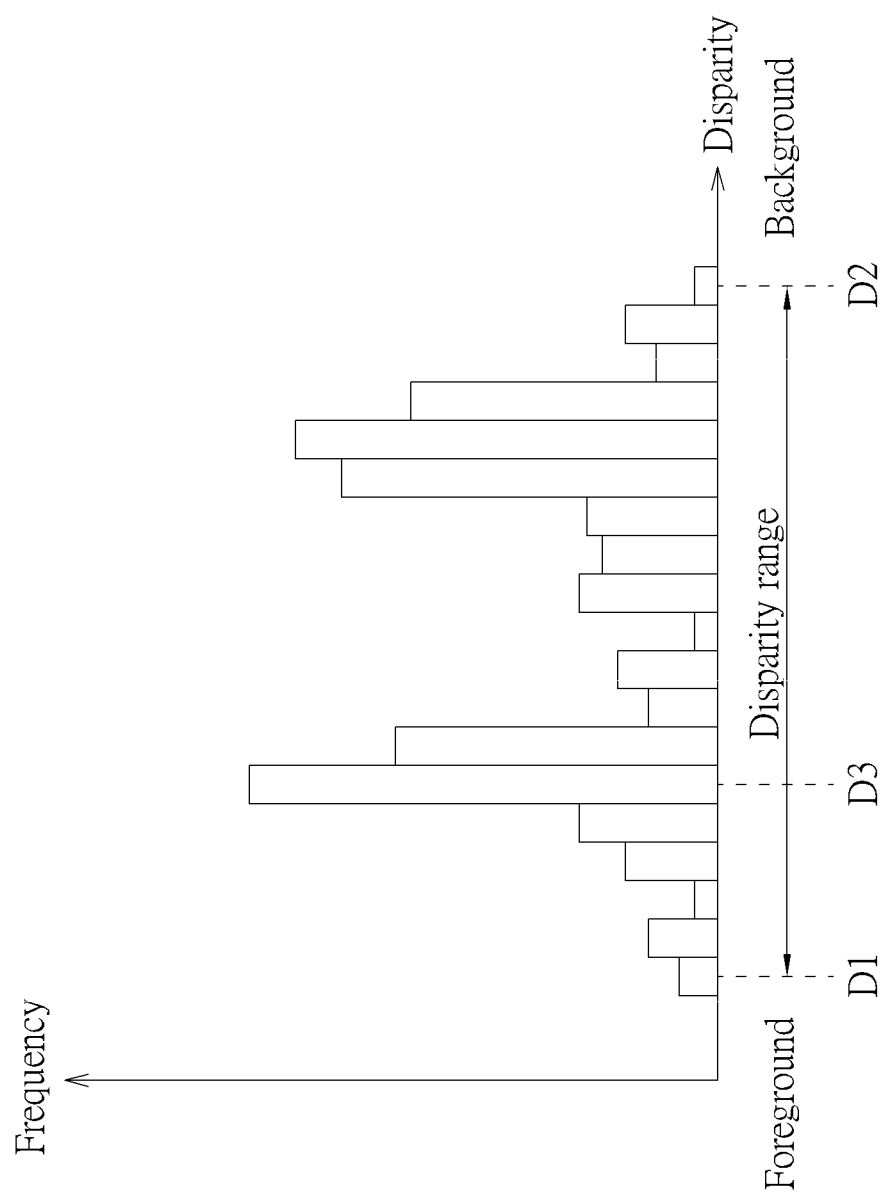
FIG. 2 is a histogram diagram of the disparity distribution of an input stereo image pair.

The disparity unit 102 is arranged for performing a disparity analysis upon the input stereo image pair, and accordingly obtaining a disparity distribution DD of the input stereo image pair. For example, the disparity unit 102 may employ one of a stereo matching algorithm, a feature point extraction and matching algorithm, and a region-based motion estimation algorithm to get the statistical analysis of the disparity distribution DD. Please refer to FIG. 2, which is a histogram diagram of the disparity distribution DD of the input stereo image pair. As shown in FIG. 2, the disparity values derived from the left-view image IMG_L and the right-view image IMG_R are within a disparity range delimited by D1 and D2, where D2 is the largest positive disparity and D1 is the smallest negative disparity. When a pixel with zero disparity is displayed on the stereo display apparatus 101, the user may view the pixel exactly on the screen of the stereo display apparatus 101. When a pixel with negative disparity is displayed on the stereo display apparatus 101, the user may view the foreground pixel in front of the screen of the stereo display apparatus 101 (i.e., close to the user). When a pixel with positive disparity is displayed on the stereo display apparatus 101, the user may view the background pixel behind the screen of the stereo display apparatus 101 (i.e., far away from the user). Hence, the disparity distribution DD of the input stereo image pair decides user's depth perception when the input stereo image pair is displayed on the stereo display apparatus 101.

As mentioned above, every user may have his/her subjective preference of depth perception. The original disparity distribution DD of the input stereo image pair may be adjusted to meet user's preference. Thus, when the disparity distribution DD does not meet user's preference, the convergence unit 104 is operative to perform intelligent convergence position adjustment upon the disparity distribution DD. Specifically, the convergence unit 104 is coupled to the disparity unit 102 and the active learning unit 106, and arranged for adaptively adjusting the input stereo image pair according to the disparity distribution DD and a learned convergence range CR, and accordingly generating the output stereo image pair to the stereo display apparatus 101 for video/image playback. It is assumed that the any user would feel most comfortable when pixels are displayed with zero disparity. Hence, the convergence unit 104 would check the disparity distribution DD to find the disparity value with a highest occurrence frequency (i.e., the disparity value to which a largest accumulation number corresponds) in the input stereo image pair. For example, the disparity value D3 shown in FIG. 2 corresponds to the highest occurrence frequency. The convergence position adjustment made by the convergence unit 104 thus regards the disparity value D3 as an initial zero disparity position to determine a shifted disparity range based on the original disparity range derived from the disparity distribution DD, and then compares the shifted disparity range with the learned convergence range CR to check if the shifted disparity range should be further shifted to make the initial zero disparity position shifted/changed to a final zero disparity position. For better understanding of technical features of the convergence position adjustment made by the convergence unit 104, several examples are given as below. It is assumed that a linear disparity adjustment is employed to shift the disparity values. Hence, as the disparity value D3 would be regarded as the initial zero disparity position $P_i$, the shifted disparity range DR' may be determined by horizontally shifting the original disparity range derived from the disparity distribution DD by D3.

In a first case where the shifted disparity range DR' is within the learned convergence range CR, the operation of the convergence unit 104 is shown in FIG. 3 and FIG. 4. As can be seen from FIG. 3, the shifted disparity range DR' is totally within the learned convergence range CR when the initial zero disparity position $P_i$ of the shifted disparity range DR' is aligned with the zero disparity position of the learned convergence range CR. Thus, no further disparity shift is needed to be applied to the shifted disparity range DR' by the convergence unit 104. As can be seen from FIG. 4, the initial zero disparity position $P_i$ is the final zero disparity position $P_f$. Based on the final zero disparity position $P_f$, the convergence unit 104 adjusts at least one of the left-view image IMG_L and the right-view image IMG_R to make the original disparity distribution DD shifted rightwards by D3 when D3 is a negative disparity value, and adjusts at least one of the left-view image IMG_L and the right-view image IMG_R to make the original disparity distribution DD shifted leftwards by D3 when D3 is a positive disparity value. In this way, the output stereo image pair, composed of the left-view image IMG_L' and the right-view image IMG_R', would have the adjusted disparity distribution with the shifted disparity range DR'.

Figures 5, 6:
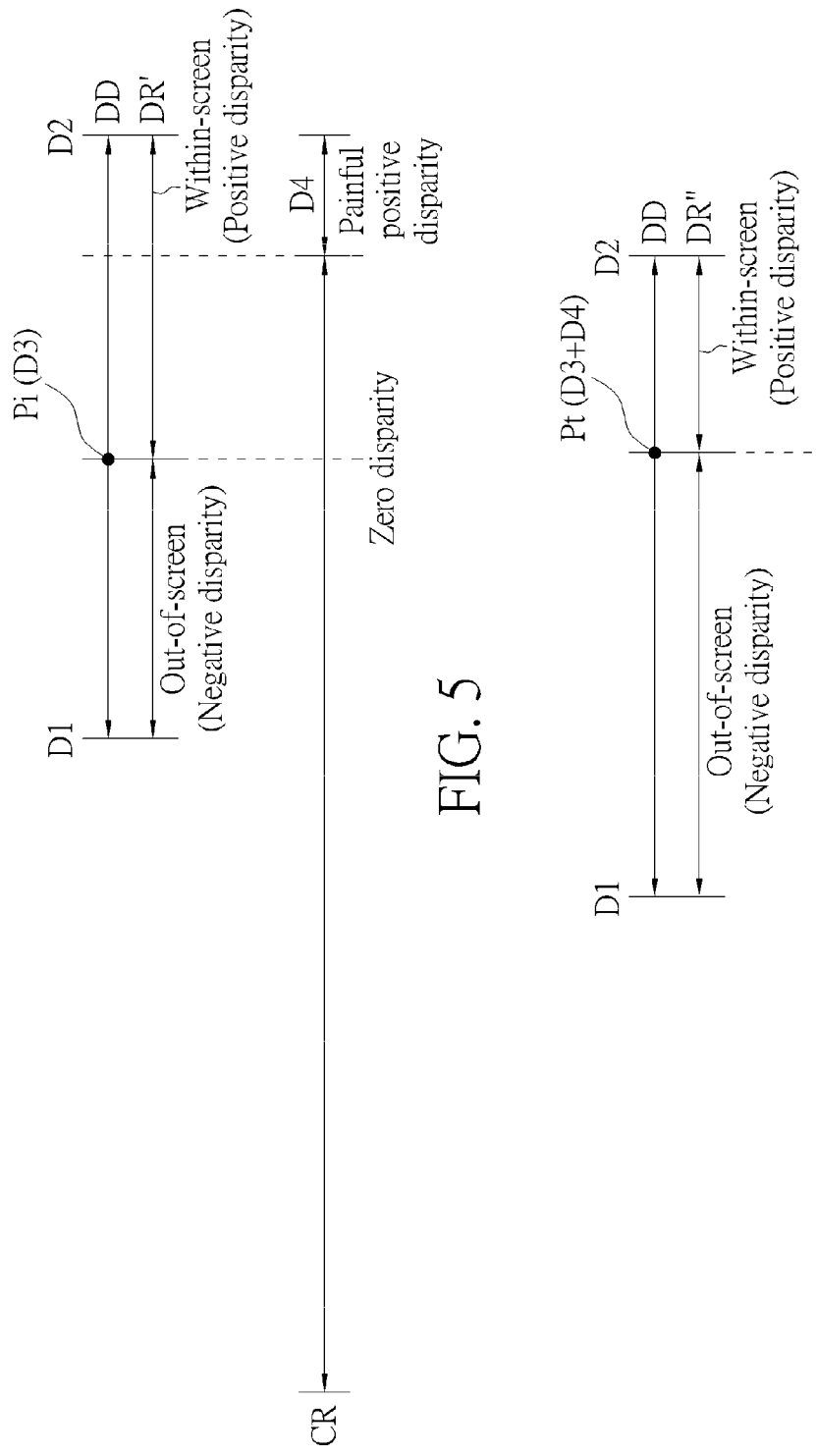
FIG. 5 and FIG. 6 show an operation of the convergence unit under a condition where the shifted disparity range is out of the learned convergence range.

In a second case where the shifted disparity range DR' is out of the learned convergence range CR, the operation of the convergence unit 104 is shown in FIG. 5 and FIG. 6. As can be seen from FIG. 5, the shifted disparity range DR' is not totally within the learned convergence range CR when the initial zero disparity position $P_i$ of the shifted disparity range DR' is aligned with the zero disparity position of the learned convergence range CR. Specifically, the shifted disparity range DR' has a painful positive disparity range D4 out of the learned convergence range CR. Thus, an additional disparity shift is needed to be applied to the shifted disparity range DR' by the convergence unit 104. As can be seen from FIG. 6, the initial zero disparity position $P_i$ is shifted to the final zero disparity position $P_f$ corresponding to the disparity value D3+D4 in the original disparity distribution DD, resulting in another shifted disparity range DR" within the learned convergence range CR. Based on the final zero disparity position $P_f$, the convergence unit 104 adjusts at least one of the left-view image IMG_L and the right-view image IMG_R to make the original disparity distribution DD shifted rightwards by D3+D4 when D3+D4 is a negative disparity value, and adjusts at least one of the left-view image IMG_L and the right-view image IMG_R to make the original disparity distribution DD shifted leftwards by D3+D4 when D3+D4 is a positive disparity value. In this way, the output stereo image pair, composed of the left-view image IMG_L' and the right-view image IMG_R', would have the adjusted disparity distribution with the shifted disparity range DR".

Figure 7:
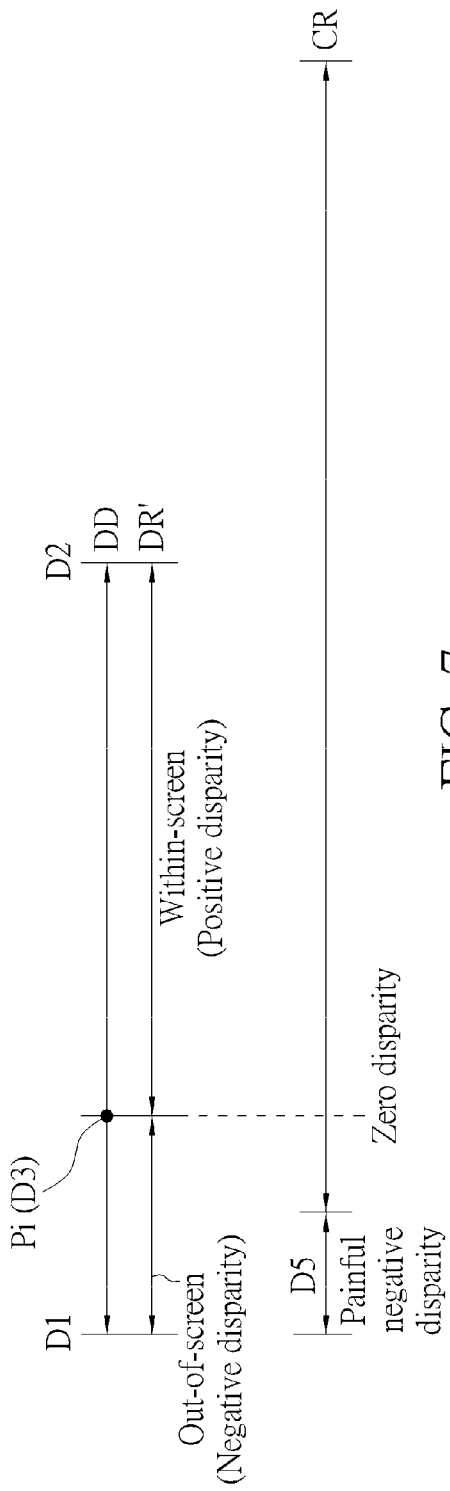
FIG. 7 and FIG. 8 show another operation of the convergence unit under a condition where the shifted disparity range is out of the learned convergence range.
Figure 8:
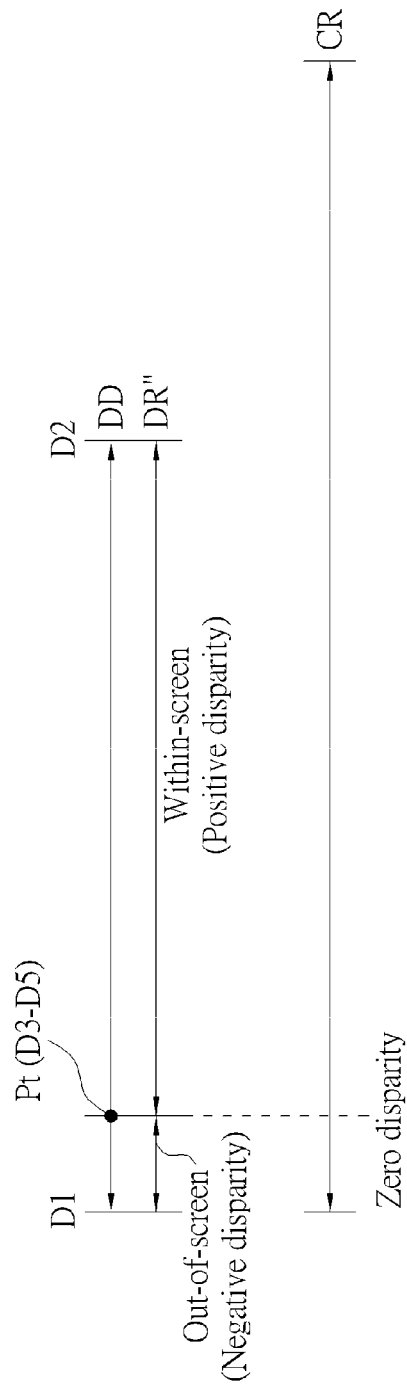

In a third case where the shifted disparity range DR' is out of the learned convergence range CR, the operation of the convergence unit 104 is shown in FIG. 7 and FIG. 8. As can be seen from FIG. 7, the shifted disparity range DR' is not totally within the learned convergence range CR when the initial zero disparity position $P_i$ of the shifted disparity range DR' is aligned with the zero disparity position of the learned convergence range CR. Specifically, the shifted disparity range DR' has a painful negative disparity range D5 out of the learned convergence range CR. Thus, an additional disparity shift is needed to be applied to the shifted disparity range DR' by the convergence unit 104. As can be seen from FIG. 8, the initial zero disparity position $P_i$ is shifted to the final zero disparity position $P_f$ corresponding to the disparity value D3-D5 in the original disparity distribution DD, resulting in another shifted disparity range DR" within the learned convergence range CR. Based on the final zero disparity position $P_f$, the convergence unit 104 adjusts at least one of the left-view image IMG_L and the right-view image IMG_R to make the original disparity distribution DD shifted rightwards by D3-D5 when D3-D5 is a negative disparity value, and adjusts at least one of the left-view image IMG_L and the right-view image IMG_R to make the original disparity distribution DD shifted leftwards by D3-D54 when D3-D5 is a positive disparity value. In this way, the output stereo image pair, composed of the left-view image IMG_L' and the right-view image IMG_R', would have the adjusted disparity distribution with the shifted disparity range DR".

Figure 9:
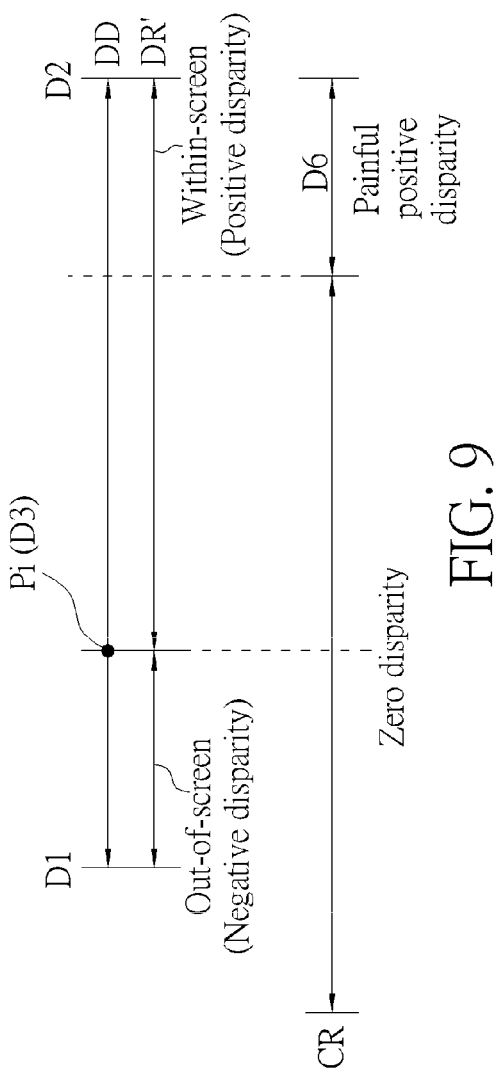
FIG. 9 and FIG. 10 show yet another operation of the convergence unit under a condition where the shifted disparity range is out of the learned convergence range.
Figure 10:
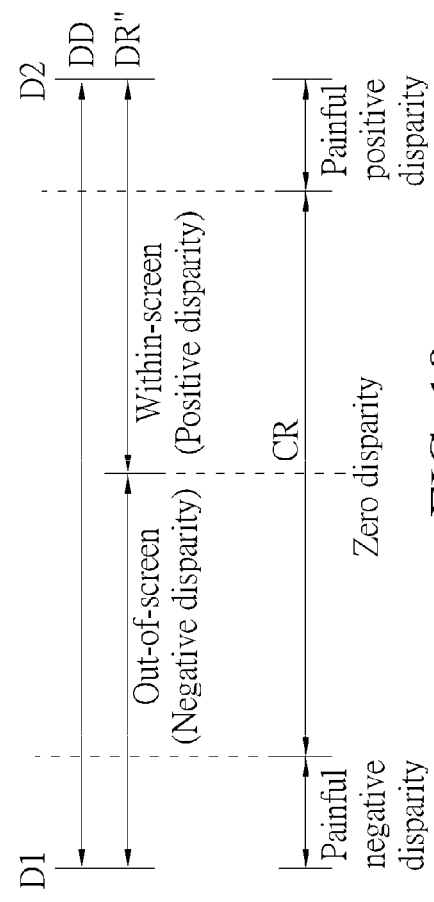

In a fourth case where the shifted disparity range DR' is out of the learned convergence range CR, the operation of the convergence unit 104 is shown in FIG. 9 and FIG. 10. As can be seen from FIG. 9, the shifted disparity range DR' is not totally within the learned convergence range CR when the initial zero disparity position $P_i$ of the shifted disparity range DR' is aligned with the zero disparity position of the learned convergence range CR. Specifically, the shifted disparity range DR' has a painful positive disparity range D6 out of the learned convergence range CR. Thus, an additional disparity shift may be applied to the shifted disparity range DR' by the convergence unit 104. However, as the size of the shifted disparity range DR' is larger than the size of the learned convergence range CR, the additional disparity shift fails to make the shifted disparity range DR' totally within the learned convergence range CR. Even though the initial zero disparity position $P_i$ is shifted to a new position, the shifted disparity range DR" is still not totally within the learned convergence range CR, and thus has a painful positive disparity range and a negative disparity range as shown in FIG. 10. To solve such an out-of-range problem, the convergence unit 104 may skip the convergence position adjustment and employ one of the following solutions. However, this is for illustrative purposes only, and is not meant to be a limitation of the present invention.

A first solution to the out-of-range problem is to scale down the image size on the stereo display apparatus 101. A second solution to the out-of-range problem is to show a two-dimensional (2D) image directly. A third solution to the out-of-range problem is to perform a 2D-to-3D technique to generate a 3D-like image. A fourth solution to the out-of-range problem is to perform a view-interpolation technique to simulate the intermediate result.

Figure 11:
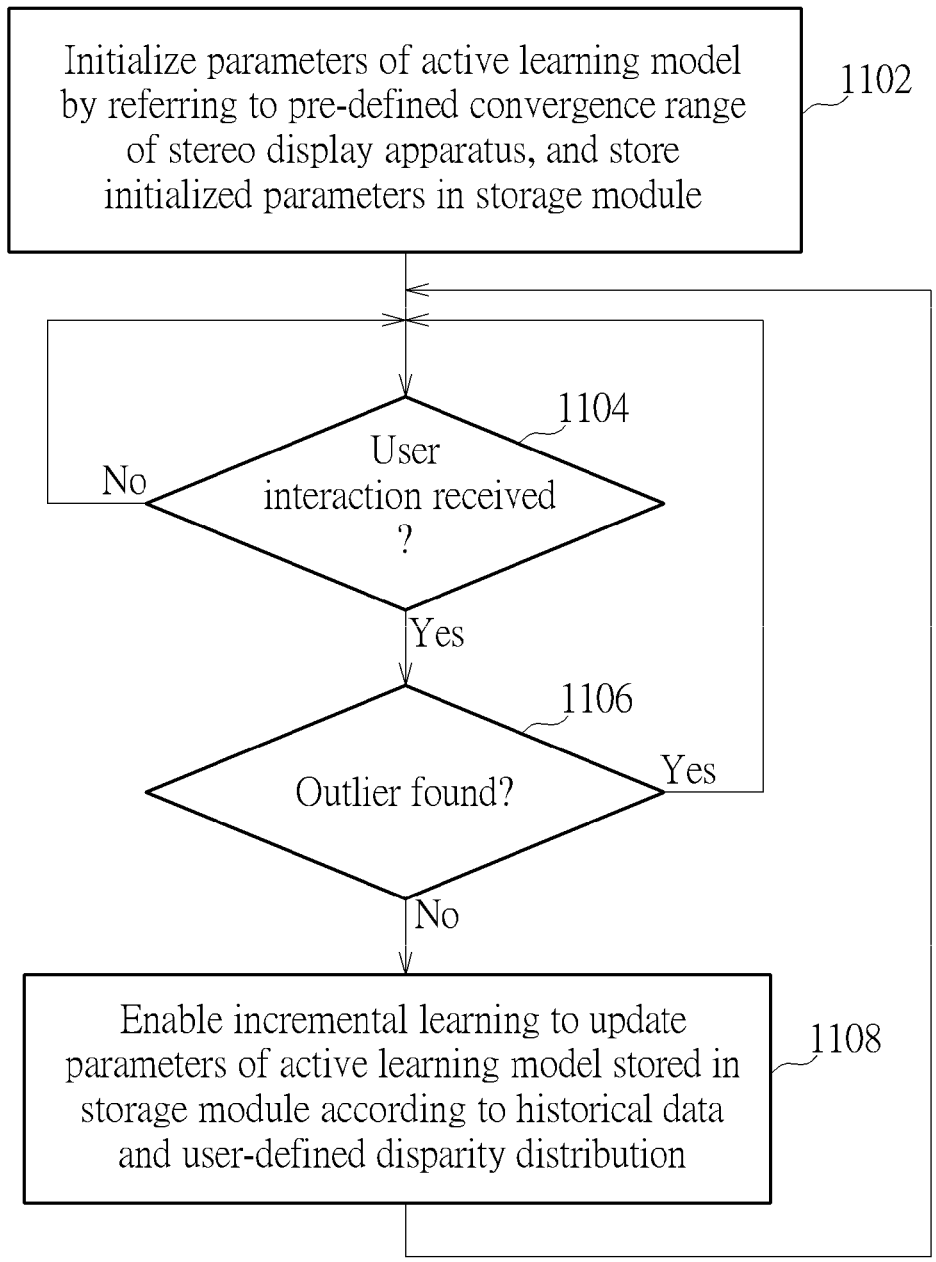
FIG. 11 is a flowchart illustrating the active learning process performed by the active learning unit according to an embodiment of the present invention.

It should be noted that the learned convergence range CR mentioned above is not a fixed convergence range during playback of stereo image pairs, and is allowed to be adaptively adjusted. Preferably, the learned convergence range CR is adaptively adjusted through an active learning process based on user interaction. Please refer to FIG. 11 in conjunction with FIG. 1. FIG. 11 is a flowchart illustrating an active learning process performed by the active learning unit 106 according to an embodiment of the present invention. Provided that the result is substantially the same, the steps are not required to be executed in the exact order shown in FIG. 11. The active learning process may include the following steps.

Step 1102: Determine initial values of parameters of an active learning model by referring to a pre-defined convergence range CR_PRE of the stereo display apparatus 101, and store the initialized parameters in the storage module 114.

Step 1104: Check if the user interaction which manually adjusts disparity of an output stereo image pair currently displayed on the stereo display apparatus is received. If yes, go to step 1106; otherwise, proceed with step 1104 again.

Step 1106: Check if the user-defined disparity distribution of the output stereo image pair is an outlier? If yes, go to step 1104; otherwise, go to step 1108;

Step 1108: Enable incremental learning to update the parameters of the active learning model stored in the storage module 114 according to the historical data (i.e., the current parameters of the active learning model before the incremental learning is enabled) and the user-defined disparity distribution of the output stereo image pair indicated by the user interaction. Go to step 1104.

In this embodiment, the active learning machine 112 determines the learned convergence range CR by referring to the parameters of the active learning model stored in the storage module 114. In the beginning, the active learning machine 112 of the active learning unit 106 initializes the learned convergence range CR (i.e., the parameters of the active learning model) by the pre-defined convergence range CR_PRE as specified in the specification of the stereo display apparatus 101 (step 1102). For example, the stereo display apparatus 101 is a 3D display panel with a pre-defined 3D vergence angle θ=typ(2D)±1°(3D), where typ(2D) is the typical 2D vergence angle represented by $$2\tan^{-1}\left(\frac{B}{2*D}\right),$$

B represents the distance between the right eye and the left eye, and D represents the distance between the panel and user's eyes. Typically, B=6.2 cm and D=30 cm when the stereo display apparatus 101 is employed in a mobile device such as a smartphone. Hence, the typical 2D vergence angle would be 11.80°. Based on the defined 3D vergence angle and the pixel specification of the 3D display panel, an empirical disparity range (i.e., the pre-defined convergence range CR_PRE) can be easily obtained. In addition to initializing the parameters of the active learning model, the pre-defined convergence range CR_PRE may also be used as a boundary condition of the learned convergence range CR. That is, even though the learned convergence range is allowed to be adaptively adjusted by the active learning process, the learned convergence range is still required to meet the specification of the stereo display apparatus 101.

The parameters of the active learning model stored in the storage module 114 are not changed until the user interaction occurs. That is, when the user is not satisfied with the depth perception presented by the output stereo image pair with the disparity distribution controlled by the learned convergence range CR, the user may manually adjust a disparity distribution of the output stereo image pair displayed on the stereo display apparatus 101 through a user interface/man-machine interface. After the desired disparity distribution of the output stereo image pair displayed on the stereo display apparatus 101 is confirmed and accepted by the user through the user interface/man-machine interface, the user interaction USER_IN which carries information of the user-defined disparity distribution is received by the active learning machine 112 (step 1104).

In this embodiment, the active learning machine 112 enables incremental learning in response to the user interaction USER_IN. Specifically, the incremental learning performed by the active learning machine 112 is configured to remove an outlier automatically to keep reliable data in the learning process by checking the user-defined disparity distribution of the output stereo image pair prior to update the learned convergence range (i.e., the parameters of the active learning model stored in the storage module 114), as shown in step 1106. For example, the outlier is found when the user-defined disparity distribution is not within the pre-defined convergence range CR_PRE and/or there is a significant difference between the learned convergence range CR currently used by the active learning machine 112 and the user-defined disparity distribution currently set by the user.

When it is determined that the user-defined disparity distribution is not an outlier, the active learning machine 112 performs the incremental learning to update the learned convergence range CR according to the user-defined disparity distribution of the output stereo image pair (step 1108).

Figure 12:
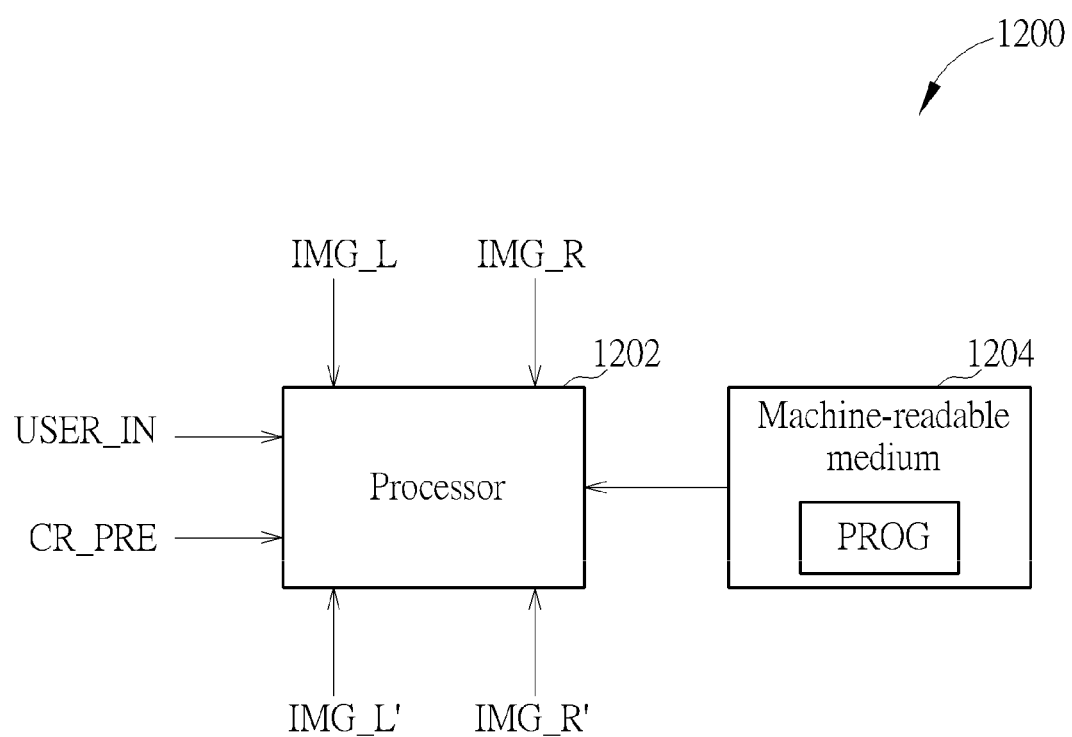
FIG. 12 is a block diagram illustrating an auto-convergence system according to a second embodiment of the present invention.

In the aforementioned embodiment, the auto-convergence system 100 may be implemented using pure hardware. However, this is for illustrative purposes only, and is not meant to be a limitation of the present invention. In an alternative design, the auto-convergence system may be implemented using a software-based design. Please refer to FIG. 12, which is a block diagram illustrating an auto-convergence system according to a second embodiment of the present invention.

The auto-convergence system 1200 includes a processor 1202 and a machine-readable medium 1204. For example, the processor 1202 may be a central processing unit (CPU), a micro control unit (MCU) or a digital signal processor (DSP), and the machine-readable medium 1204 may be a memory device such as a non-volatile memory. The machine-readable medium 1204 stores a program code PROG. Hence, when the program code PROG is executed by the processor 1202, the processor 1202 is instructed to perform the operations of the aforementioned auto-convergence system 100. For example, the processor 1202 may be instructed by the program code PROG to do the following tasks: performing a disparity analysis upon an input stereo image pair, and accordingly obtaining a disparity distribution of the input stereo image pair; actively learning a convergence range during playback of stereo image pairs and accordingly determining a learned convergence range; and performing an active learning process for adaptively adjusting the input stereo image pair according to the disparity distribution and the learned convergence range, and accordingly generating an output stereo image pair for playback. As a person skilled in the art can readily understand technical features of the auto-convergence system 1200 after reading above paragraphs directed to the auto-convergence system 100, further description is omitted here for brevity.

Figure 13:
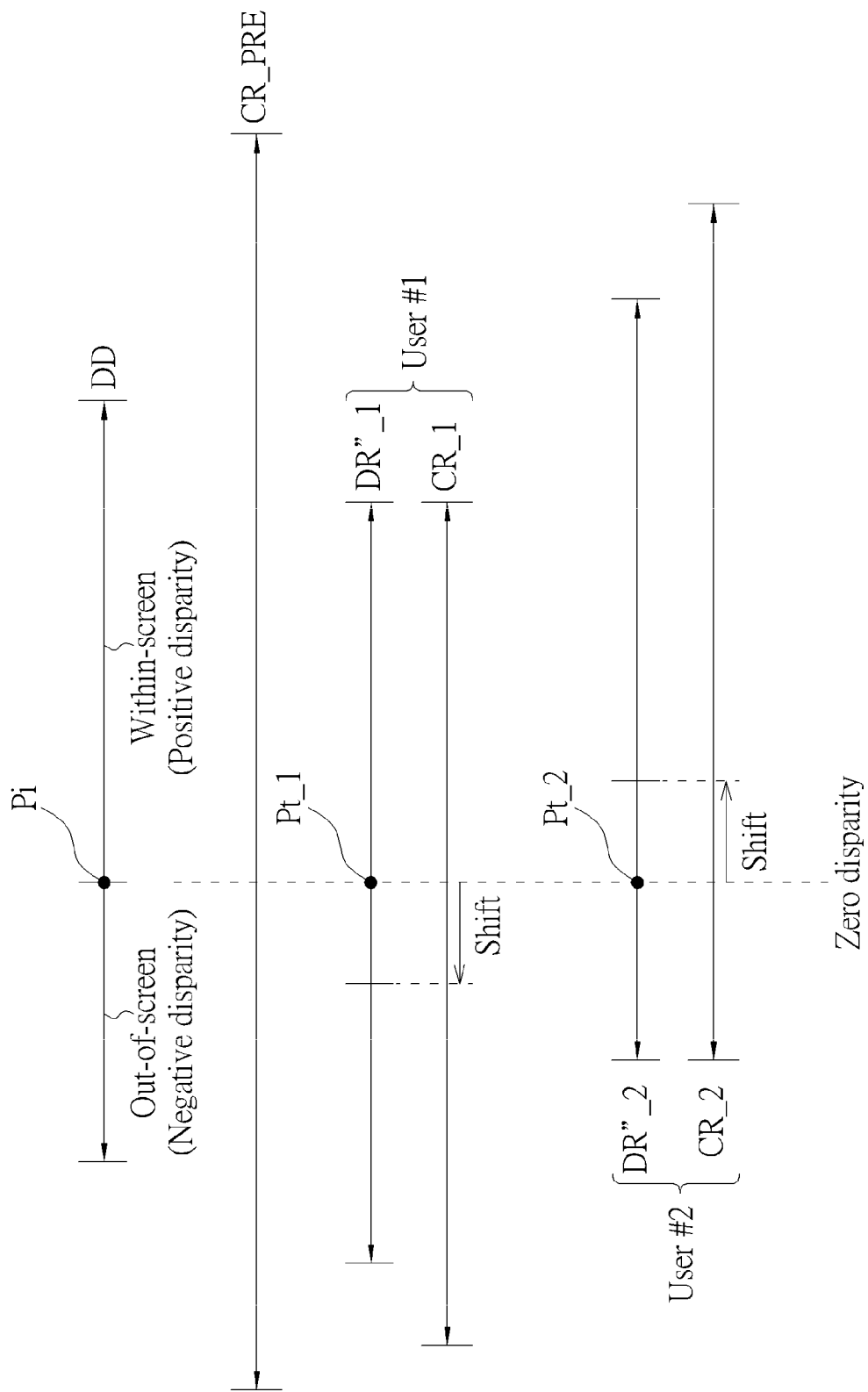
FIG. 13 is a diagram illustrating convergence positions determined under different learned convergence ranges of individual users according to an embodiment of the present invention.

Briefly summarized, the present invention proposes using an active learning process to provide a learned convergence range for auto-convergence control. Hence, a subjective preference of depth perception of an individual user can be estimated using the active learning process based on user interaction. In other words, different users are allowed to have different personalized comfortable convergence range settings when viewing the 3D image/video playback. Please refer to FIG. 13, which is a diagram illustrating convergence positions determined under different learned convergence ranges of individual users according to an embodiment of the present invention. In this embodiment, each of the learned convergence range CR_1 for a first user and the learned convergence range CR_2 for a second user is within the pre-defined convergence range CR_PRE, and therefor meets the specification of the stereo display apparatus 101. As can be seen from FIG. 13, when the initial zero disparity position Pi (e.g., D3 in above embodiments) found in the disparity distribution DD of the input stereo image pair is aligned with the zero disparity position of the learned convergence range CR_1, the disparity distribution DD is not totally within the learned convergence range CR_1. Thus, a final shifted disparity range DR"_1 for the first user may be obtained by shifting the disparity distribution DD according to the methodology shown in FIG. 5 and FIG. 6 to thereby have a new zero disparity position Pt_1. Similarly, when the initial zero disparity position Pi (e.g., D3 in above embodiments) found in the disparity distribution DD of the input stereo image pair is aligned with the zero disparity position of the learned convergence range CR_2, the disparity distribution DD is not totally within the learned convergence range CR_2. Thus, a final shifted disparity range DR"_2 for the second user may be obtained by shifting the disparity distribution DD according to the methodology shown in FIG. 7 and FIG. 8 to thereby have a new zero disparity position Pt_2. As can be seen from FIG. 13, the shifted disparity range DR"_2 is different from the shifted disparity range DR"_1 due to different learned convergence ranges CR_1 and CR_2. Hence, when the same input image pair with the disparity distribution DD is processed by the auto-convergence system 100/1200 of the present invention, the first user will have his/her preferred depth perception due to the fact that an output image pair with the shifted disparity range DR"_1 is displayed on the stereo display apparatus 101, and the second user will have his/her preferred depth perception due to the fact that an output image pair with the shifted disparity range DR"_2 is displayed on the stereo display apparatus 101.

Those skilled in the art will readily observe that numerous modifications and alterations of the device and method may be made while retaining the teachings of the invention. Accordingly, the above disclosure should be construed as limited only by the metes and bounds of the appended claims.

What is claimed is:

1. An auto-convergence system, comprising:
   a disparity unit, arranged for performing a disparity analysis upon an input stereo image pair, and accordingly obtaining a disparity distribution of the input stereo image pair, wherein the disparity distribution is obtained based on disparity values of the input stereo image pair, and the disparity distribution is within an original disparity range delimited by a largest disparity value and a smallest disparity value among the disparity values of the input stereo image pair;
   a convergence unit, coupled to the disparity unit and arranged for deriving a specific disparity range from the original disparity range, adaptively adjusting the input stereo image pair according to a comparison result derived from comparing the specific disparity range with a learned convergence range, and accordingly generating an output stereo image pair for playback; and
   an active learning unit, coupled to the convergence unit and arranged for actively learning a convergence range during playback of stereo image pairs and accordingly determining the learned convergence range;
   wherein the specific disparity range is delimited by a first disparity value and a second disparity value, and the first disparity value is larger than the second disparity value, and
   wherein the convergence range is a disparity range delimited by a third disparity value and a fourth disparity value, and the third disparity value is larger than the fourth disparity value.

2. The auto-convergence system of claim 1, wherein each stereo image pair is arranged to be displayed on a stereo display apparatus with a pre-defined convergence range; and the active learning unit initializes the learned convergence range by the pre-defined convergence range.

3. The auto-convergence system of claim 1, wherein each stereo image pair is arranged to be displayed on a stereo display apparatus with a pre-defined convergence range; and the active learning unit uses the pre-defined convergence range as a boundary condition of the learned convergence range.

4. The auto-convergence system of claim 1, wherein the active learning unit enables incremental learning to adaptively update the learned convergence range in response to a user interaction.

5. The auto-convergence system of claim 4, wherein each stereo image pair is arranged to be displayed on a stereo display apparatus; and when the active learning unit receives the user interaction which manually adjusts a disparity distribution of the output stereo image pair displayed on the stereo display apparatus, the incremental learning updates the learned convergence range according to the user-defined disparity distribution of the output stereo image pair.

6. The auto-convergence system of claim 5, wherein the incremental learning further removes an outlier by checking the user-defined disparity distribution of the output stereo image pair prior to updating the learned convergence range.

7. An auto-convergence method, comprising:
   performing a disparity analysis upon an input stereo image pair, and accordingly obtaining a disparity distribution of the input stereo image pair, wherein the disparity distribution is obtained based on disparity values of the input stereo image pair, and the disparity distribution is within an original disparity range delimited by a largest disparity value and a smallest disparity value among the disparity values of the input stereo image pair;
   actively learning a convergence range during playback of stereo image pairs, and accordingly determining a learned convergence range; and
   performing an active learning process for deriving a specific disparity range from the original disparity range, adaptively adjusting the input stereo image pair according to a comparison result derived from comparing the specific disparity range with the learned convergence range, and accordingly generating an output stereo image pair for playback;
   wherein the specific disparity range is delimited by a first disparity value and a second disparity value, and the first disparity value is larger than the second disparity value; and
   wherein the convergence range is a disparity range delimited by a third disparity value and a fourth disparity value, and the third disparity value is larger than the fourth disparity value.

8. The auto-convergence method of claim 7, wherein each stereo image pair is arranged to be displayed on a stereo display apparatus with a pre-defined convergence range; and the active learning process initializes the learned convergence range by the pre-defined convergence range.

9. The auto-convergence method of claim 7, wherein each stereo image pair is arranged to be displayed on a stereo display apparatus with a pre-defined convergence range; and the active learning process uses the pre-defined convergence range as a boundary condition of the learned convergence range.

10. The auto-convergence method of claim 7, wherein the active learning process enables incremental learning to adaptively update the learned convergence range in response to a user interaction.

11. The auto-convergence method of claim 10, wherein each stereo image pair is arranged to be displayed on a stereo display apparatus; and when the active learning process receives the user interaction which manually adjusts a disparity distribution of the output stereo image pair displayed on the stereo display apparatus, the incremental learning updates the learned convergence range according to the user-defined disparity distribution of the output stereo image pair.

12. The auto-convergence method of claim 11, wherein the incremental learning further removes an outlier automatically by checking the user-defined disparity distribution of the output stereo image pair prior to updating the learned convergence range.

13. A non-transitory machine-readable medium storing a program code, wherein when the program code is executed by a processor, the processor is instructed to perform following steps:
   performing a disparity analysis upon an input stereo image pair, and accordingly obtaining a disparity distribution of the input stereo image pair, wherein the disparity distribution is obtained based on disparity values of the input stereo image pair, and the disparity distribution is within an original disparity range delimited by a largest disparity value and a smallest disparity value among the disparity values of the input stereo image pair;

actively learning a convergence range during playback of stereo image pairs and accordingly determining a learned convergence range; and performing an active learning process for deriving a specific disparity range from the original disparity range, adaptively adjusting the input stereo image pair according to a comparison result derived from comparing the specific disparity range with and the learned convergence range, and accordingly generating an output stereo image pair for playback;

wherein the specific disparity range is delimited by a first disparity value and a second disparity value, and the first disparity value is larger than the second disparity value; and wherein the convergence range is a disparity range delimited by a third disparity value and a fourth disparity value, and the third disparity value is larger than the fourth disparity value.

14. The non-transitory machine-readable medium of claim 13, wherein each stereo image pair is arranged to be displayed on a stereo display apparatus with a pre-defined convergence range; and the active learning process initializes the learned convergence range by the pre-defined convergence range.

15. The non-transitory machine-readable medium of claim 13, wherein each stereo image pair is arranged to be displayed on a stereo display apparatus with a pre-defined convergence range; and the active learning process uses the pre-defined convergence range as a boundary condition of the learned convergence range.

16. The non-transitory machine-readable medium of claim 13, wherein the active learning process enables incremental learning to adaptively update the learned convergence range in response to a user interaction.

17. The non-transitory machine-readable medium of claim 16, wherein each stereo image pair is arranged to be displayed on a stereo display apparatus; and when the active learning process receives the user interaction which manually adjusts a disparity distribution of the output stereo image pair displayed on the stereo display apparatus, the incremental learning updates the learned convergence range according to the user-defined disparity distribution of the output stereo image pair.

18. The non-transitory machine-readable medium of claim 17, wherein the incremental learning further removes an outlier automatically by checking the user-defined disparity distribution of the output stereo image pair prior to updating the learned convergence range.

* * * * *